(No Model.)
B. BIDWELL.
ELECTRICAL RAILWAY.
No. 305,730. Patented Sept. 23, 1884.
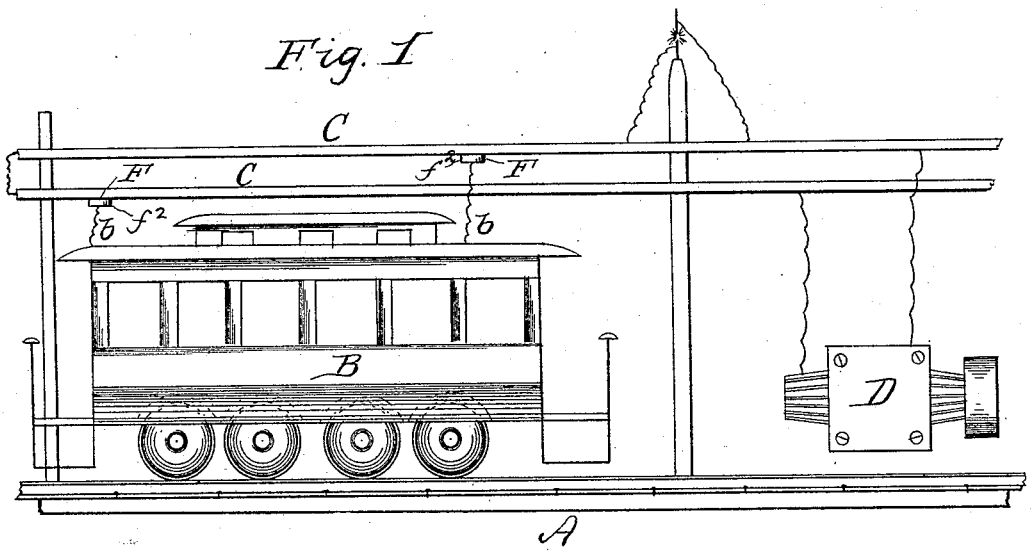
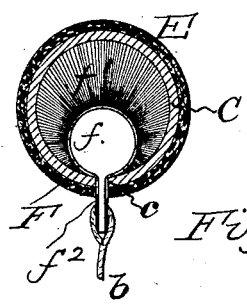
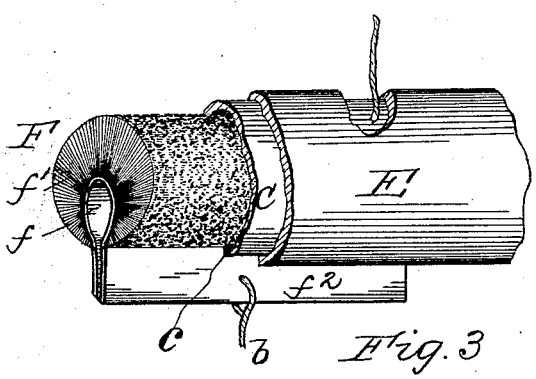
Witnesseth:
T. F. Holden.
M. F. Halleck
Inventor,
Benson Bidwell
By S. J. Van Stavoren
Attorney.

United States Patent Office.

BENSON BIDWELL, OF GRAND RAPIDS, MICHIGAN.

ELECTRICAL RAILWAY.

SPECIFICATION forming part of Letters Patent No. 305,730, dated September 23, 1884.

Application filed February 16, 1884. (No model.)

*To all whom it may concern:*

Be it known that I, BENSON BIDWELL, a citizen of the United States, residing at Grand Rapids, in the county of Kent and State of Michigan, have invented certain new and useful Improvements in Electrical Railways, of which the following is a specification.

Figure 1 is an elevation of so much of a railway and appurtenances as is necessary to illustrate my invention. Fig. 2 is a transverse section of a slotted tubular conductor and of a traveling contact-brush, and Fig. 3 is a broken perspective of the same.

My invention has relation to electric railways.

The object of this invention is to improve the form of the contact-brush; and the invention consists of constructions and combinations, all as will hereinafter be described, and pointed out in the claims.

In the drawings, A represents a line of railway, and B a car, which in practice is designed to be furnished with any suitable form of electromotor in gear with the axles, and from the motor lead the wires or conductors $b\ b$.

C C represent the line-wires or conductors, of which there are two, to form a closed metallic circuit for the dynamo or other electric generator, (represented at D,) which is located at a central or other station along the line of way. The electric generator D, or as many of them as are used, supplies the conductors C C with the necessary current for operating the electromotors on the cars.

In practice the closed circuit of the line or the generator D is provided with suitable switches to open the circuit whenever desired.

The conductors C C are tubular in cross-section, or are composed of pipe-sections electrically connected, and have longitudinal slots or kerfs $c$ running from end to end of the same. These conductors are mounted upon poles or otherwise supported in proximity to the tracks A, with their slots $c$ turned downward, as shown, to prevent dust, snow, rain, &c., accumulating in the bores or on the inside surfaces of the conductors, thereby keeping such surfaces clean or in good condition for obtaining electrical contact therewith. The tubular formation of the conductors C C prevent them from sagging when suspended upon poles or when the contact-brushes move along the same.

To avoid leakage of current from the outside surfaces of the conductors, they are exteriorly covered or coated with glass, vulcanized rubber, cement, soft or other rubber tubes, or any suitable non-conducting material, E, as more plainly shown in Figs. 2 and 3.

F F represent the traveling contact-brushes, which are each composed of a tubular body or carriage, $f$, made of metal, and having suitable perforations, in which are inserted tufts or single wires $f'$. These wires may be of the same length or of different lengths, as shown, to form an exterior eccentric-shaped brush for the carriage $f$, which also has a depending guide or flange, $f^2$.

When the carriage $f$ is made of sheet metal, as illustrated, its meeting sides are bent to form said guide or plate $f^2$. The brushes F travel along the bores of the conductors C, and the flanges or guides $f^2$ of the former project through the slots $c$ of the latter. The wires $f'$ of brushes F make the contact with the inner surfaces of the conductors to complete the circuit of the latter or the generator D by way of wires $b$ to the electromotor upon the cars, the outer ends of said wires $b$ being connected to the contact-brush guides $f^2$ in any suitable manner.

If iron pipes are employed for the conductors C, their inner or contact surfaces may be lined with a film of copper to obtain increased conductivity for the line-current.

The operation is obvious. The dynamo D and the motors upon the cars being switched into the line-circuit, such motors are set in motion to propel the car, and as it travels the contact-brushes move therewith to maintain the circuit for the motors and provide for the continuous advance or travel of the cars.

In the drawings I have shown provision for utilizing the line-current for illuminating purposes; but I do not herein claim the same, as I intend making it the subject of another application; nor do I claim in this application the broad idea of a metallic line-circuit composed of tubular conductors having longitudinal slots and interior contact-surfaces, said slots being preferably turned downwardly to form the bottom sides of the conductor, and combined with a movable brush; nor do I claim said conductors provided with an exterior coating or covering of non-conducting material, as these matters form the subject-matter of another application.

What I claim is—

1. In an electrical railway, the combination, with the slotted tubular conductors C C, of tubular contact-brushes F F, having guides $f^2$, forming part of the tube, substantially as shown and described.

2. In an electrical railway, the combination of tubular conductors C, having slots $c$, contact-brushes F, having guides $f^2$, forming part of the tube, and wires $f'$ and circuit-connections, substantially as shown and described.

BENSON BIDWELL.

Witnesses:
WM. A. REED,
HORATIO WILLARD.